(12) United States Patent
Medwed et al.

(10) Patent No.: US 11,651,354 B2
(45) Date of Patent: May 16, 2023

(54) EFFICIENT PARTIALLY SPENDABLE E-CASH

(71) Applicant: NXP B.V., Eindhoven (NL)

(72) Inventors: Marcel Medwed, Graz (AT); Mario Lamberger, Graz (AT)

(73) Assignee: NXP B.V., Eindhoven (NL)

( * ) Notice: Subject to any disclaimer, the term of this patent is extended or adjusted under 35 U.S.C. 154(b) by 184 days.

(21) Appl. No.: 16/567,626

(22) Filed: Sep. 11, 2019

(65) Prior Publication Data

US 2021/0073797 A1    Mar. 11, 2021

(51) Int. Cl.
    *G06Q 20/36* (2012.01)
    *G06Q 20/06* (2012.01)
    *G06Q 20/38* (2012.01)

(52) U.S. Cl.
    CPC ..... *G06Q 20/3678* (2013.01); *G06Q 20/0655* (2013.01); *G06Q 20/383* (2013.01); *G06Q 20/3825* (2013.01)

(58) Field of Classification Search
    CPC ........... G06Q 20/3678; G06Q 20/0655; G06Q 20/3825; G06Q 20/383
    See application file for complete search history.

(56) References Cited

U.S. PATENT DOCUMENTS

| | | |
|---|---|---|
| 4,914,369 A | 4/1990 | Chaum |
| 4,914,698 A | 4/1990 | Chaum |
| 5,696,827 A | 12/1997 | Brands |
| 5,999,625 A | 12/1999 | Bellare et al. |
| 9,454,755 B2 | 9/2016 | Gouget |
| 10,262,321 B1* | 4/2019 | Ramanathan ...... G06Q 20/3829 |
| 2008/0195499 A1 | 8/2008 | Meredith et al. |
| 2016/0267472 A1* | 9/2016 | Lingham ............. G06Q 20/20 |
| 2016/0283939 A1* | 9/2016 | Finlow-Bates ...... G06Q 20/405 |

(Continued)

FOREIGN PATENT DOCUMENTS

| | | | |
|---|---|---|---|
| WO | 99/26207 A1 | 5/1999 | |
| WO | 02/05152 A1 | 1/2002 | |
| WO | WO-2020126078 A1 * | 6/2020 | ............. G06Q 20/29 |

OTHER PUBLICATIONS

"Sebastien Canard et al., Divisible E-Cash Made Practical, 2015, International Conference on Practice and Theory in Public-Key Cryptography, pp. 1-21" (Year: 2015).*

(Continued)

*Primary Examiner* — Courtney P Jones

(57) ABSTRACT

A method for managing an anonymous e-cash transaction includes receiving a request to withdraw a payment coin, generating a combination of random attributes for the payment coin, creating the payment coin based on the combination of attributes, and issuing the payment coin in exchange for a first asset. Each attribute of the combination of attributes may represent a different portion of a total value of the payment coin. A partially spent value of the payment coin may be based on a revealed subset of the combination of attributes. The method further includes
  creating a refund coin based on the combination of attributes and spending the refund coin to issue a refund having a value corresponding to an unspent portion of the payment coin. Each attribute of the combination of attributes of the refund coin may represent a different portion of a total value of the refund coin.

25 Claims, 6 Drawing Sheets

(56) References Cited

U.S. PATENT DOCUMENTS

| | | | | |
|---|---|---|---|---|
| 2017/0103394 | A1* | 4/2017 | Colhoun | G06Q 20/3674 |
| 2017/0236121 | A1* | 8/2017 | Lyons | G06Q 20/065 |
| | | | | 705/71 |
| 2017/0249607 | A1* | 8/2017 | Samid | G06Q 20/065 |
| 2018/0276663 | A1* | 9/2018 | Arora | H04L 9/14 |
| 2019/0130371 | A1* | 5/2019 | Hale | G06Q 20/385 |
| 2019/0303887 | A1* | 10/2019 | Wright | G06Q 20/0658 |
| 2020/0097967 | A1* | 3/2020 | Patel | G06Q 20/06 |
| 2020/0167741 | A1* | 5/2020 | Gamaroff | H04L 9/3239 |
| 2020/0402031 | A1* | 12/2020 | Pira | G06Q 20/108 |
| 2021/0201396 | A1* | 7/2021 | Soundararajan | G06Q 30/01 |

OTHER PUBLICATIONS

"Jia-Ning Luo, Offline Transferable E-Cash Mechanism, 2018, IEEE, p. 1-2)" (Year: 2018).*

Baldimtsi, F., et al. "Anonymous Credentials Light", ACM-CCS, 19 pages. (2013).

Brands, S. "An Efficient Off-Line Electronic Cash System Based on the Representation Problem", CRYPTO, 77 pages. (1993).

Camenisch, J., et al. "Compact E-Cash", EUROCRYPT, 36 pages. (2005).

Canard, S., et al. "Divisible E-Cash Made Practical", PKC, 21 pages. (2015).

Canard, S., et al. "Divisible E-cash Systems can be Truly Anonymous", EUROCRYPT, 18 pages. (2007).

Chaum, D., et al. "Untraceable Electronic Cash", CRYPTO, 9 pages. (1998).

Hinterwalder, G., et al. "Efficient E-cash in Practice: NFC-based Payments for Public Transportation Systems", Privacy enhancing technologies, 20 pages. (2013).

Martens, P. "Practical Divisible E-Cash", 30 pages, online. (https://eprint.iacr.org/2015/318.pdf). (Downloaded Sep. 24, 2019).

Pointcheval, D., et al. "Cut Down the Tree to Achieve Constant Complexity in Divisible E-Cash", Public Key Cryptography, 29 pages. (2015).

Rupp, A., et al. "Cryptographic Theory Meets Practice: Efficient and Privacy-Preserving Payments for Public Transport", ACM Transactions on Information and System Security, 38 pages. (2015).

* cited by examiner

EFFICIENT PARTIALLY SPENDABLE E-CASH

TECHNICAL FIELD

Example embodiments disclosed herein relate generally to managing electronic transactions.

BACKGROUND

A variety of electronic currencies have been developed in the last few years. These currencies are now being accepted by many public and private entities in lieu of payments made by traditional means. Examples of electronic currencies include various types of e-cash and cryptocurrencies, the most popular of the latter being Bitcoin and Etherium. The essence of e-cash is to provide an anonymous payment scheme where spending can be executed offline (as opposed to cryptocurrencies which are entirely online-based). Also, in some cases cheating parties can be identified and prosecuted when e-cash is used for payment.

E-cash has evolved in three stages. In the first stage, e-cash was implemented using a single coin scheme. The main drawback of this scheme is that it cannot be used without significant overhead when more than one coin is required to satisfy the requirements of a transaction. Also, no change or refunds are possible. Thus, transactions cannot be made even when sufficient money is available for payment. Also, implementing this e-cash scheme requires substantial storage and computational overhead. Attempts were made to overcome these drawbacks during withdrawal using so-called Compact E-cash, but even in this case computational overhead during spending remains.

In the second stage, a refundable e-cash scheme was implemented. According to this scheme, a merchant could receive an entire coin from a buyer, even when the value of the coin exceeded the amount to pay. To make up the difference, the merchant would give the buyer change in the form of a refund token. One major disadvantage of this scheme is that the merchant and bank need to trust each other. Otherwise, a merchant could produce refund tokens in an uncontrolled quantity and value.

In the third stage, and in effort to solve problems associated with refundable e-cash, an anonymous divisible e-cash scheme was introduced. In a divisible e-cash scheme, one coin may be used to pay for many transactions of lesser value, where each transaction spends only part of the coin until finally the entire coin has been spent. Major disadvantages associated with divisible e-cash include impractical storage overhead or prohibitive computational costs. For instance, the bank may need to store several megabytes for a single coin. Considering an ecosystem with potentially millions of users, each having several coins, a bank implementing a divisible e-cash scheme would have to maintain and search hundreds of terabytes of data, which is clearly impractical.

Additionally, the computational costs associated with divisible e-cash are, by magnitudes, beyond a time period which has been deemed practically acceptable for transactions. For example, multi-base exponentiations (ME) with around N=1000 bases may be used, but in practice the precomputation required for ME is exponential in the number of bases, which is hardly realistic. This, in turn, means that one ME may takes at least 100 times longer than a normal one.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

Various embodiments relate to a method for managing an e-cash transaction, including: receiving a first request to withdraw a payment coin; receiving a commitment to a combination of attributes for the payment coin; creating the payment coin based on the commitment to the combination of attributes; and issuing the payment coin in exchange for a first asset, wherein each attribute of the combination of attributes represents a different portion of a total value of the payment coin and wherein a partially spent value of the payment coin is based on a revealed subset of the combination of attributes.

Various embodiments are described, further including: receiving a second request to redeem the partially spent value of the payment coin; confirming validity of the payment coin; receiving the revealed subset of the combination of attributes; confirming the validity of the subset of the combination of attributes; and providing a second asset for the partially spent value of the payment coin.

Various embodiments are described, wherein: the first request is received from a buyer; the second request is received from a seller; and the payment coin is issued by a bank with account of the buyer.

Various embodiments are described, wherein creating the payment coin includes digitally signing a commitment based on a payment key of a bank using a blind signature scheme.

Various embodiments are described, further including: creating a refund coin based on the commitment to the combination of attributes; and spending the refund coin to issue a refund for an unspent portion of the payment coin, wherein the refund coin has a value determined based on unrevealed attributes of the combination of attributes of the partially spent payment coin.

Various embodiments are described, wherein creating the refund coin includes digitally signing the commitment based on a refund key of a bank using a blind signature scheme.

Various embodiments are described, further including: confirming an identity of an entity that attempts to spend the refund coin.

Various embodiments are described, further including: performing a double-refund check prior to issuing the refund.

Various embodiments are described, wherein: the first asset corresponds to a sum of money deposited into a bank account, and the sum of money backs the total value of the payment coin.

Various embodiments are described, further including: performing an over-spending check prior to issuing payment to a merchant for the partially spent value of the payment coin.

Further various embodiments relate to a method for managing an e-cash transaction, including: withdrawing a payment coin in exchange for an asset; imparting a partial value to the payment coin based on a purchase price; and spending the payment coin to buy an item for the purchase price, wherein: (a) the payment coin is based on a combination of attributes, each attribute representing a different portion of a total value of the payment coin, (b) the partial value corresponds to a subset of the combination of attributes, and (c) spending the payment coin includes revealing the subset of the combination of attributes to a seller for submission to a bank for redeeming the partial value.

Various embodiments are described, further including: redeeming an unspent portion of the total value of the payment coin, wherein redeeming the unspent portion includes spending a refund coin that is based on the combination of attributes, each attribute of the combination of attributes of the refund coin representing a different portion of the total value of the refund coin.

Further various embodiments relate to a system for managing an e-cash transaction, including: a storage area configured to store information of a payment coin; a memory configured to store instructions of at least one algorithm to manage the payment coin; and a processor configured to execute the at least one algorithm to: (a) receive a first request to withdraw a payment coin;

(b) generate a combination of attributes for the payment coin; (c) generate a commitment to the combination of attributes; and (d) issue the payment coin in exchange for a first asset, wherein each attribute of the combination of attributes represents a different portion of a total value of the payment coin and wherein a partially spent value of the payment coin is based on a revealed subset of the combination of attributes.

Various embodiments are described, wherein the processor is configured to execute the at least one algorithm to: receive a second request to redeem the partially spent value of the payment coin; confirm validity of the payment coin; receive the revealed subset of the combination of attributes; confirm the validity of the subset of the combination of attributes; and provide a second asset for the partially spent value of the payment coin.

Various embodiments are described, wherein the processor is configured to generate the payment coin by digitally signing a commitment based on a payment key of a bank, using a blind digital signature scheme.

Various embodiments are described, wherein the processor is configured to execute at least one algorithm to: create a refund coin based on the combination of attributes; and spend the refund coin to issue a refund for an unspent portion of the payment coin, wherein the refund coin has a value determined based on unrevealed attributes of the combination of attributes of the partially spent payment coin.

Further various embodiments relate to a method for managing an anonymous e-cash transaction, including: receiving a first request to withdraw a payment coin; generating a random combination of attributes for the payment coin; computing a commitment for the combination of attributes of the payment coin; and issuing the payment coin in exchange for a first asset, wherein each attribute of the combination of attributes contained in the payment coin represents a different portion of a total value of the payment coin, and wherein a partially spent value of the payment coin is based on a revealed subset of the combination of attributes of the payment coin.

Various embodiments are described, further including: creating a refund coin based on the first request, wherein the refund coin is based on the combination of attributes of the payment coin.

Various embodiments are described, wherein a value of the refund coin is based on an unrevealed subset of the combination of attributes of the payment coin.

Various embodiments are described, further including: spending the refund coin to issue a refund having a value corresponding to an unspent portion of the payment coin.

Various embodiments are described, further including: performing a double-refund check prior to issuing the refund.

Various embodiments are described, further including: performing an over-spending check prior to issuing payment to a merchant for the partially spent value of the payment coin.

Further various embodiments relate to a method for managing an anonymous e-cash transaction, including: receiving a first request to withdraw a payment coin; generating a random combination of attributes for the payment coin; computing commitments for the combination of attributes of the payment coin and the refund coin, respectively; creating a refund coin with a commitment to the combination of attributes for the payment coin; issuing the payment coin and the refund coin, the payment coin issued in exchange for a first asset, wherein each attribute of the combination of attributes contained in the payment coin represents a different portion of a total value of the payment coin, and wherein a partially spent value of the payment coin is based on a revealed subset of the combination of attributes of the payment coin.

Various embodiments are described, wherein: the first request is received from a buyer; the second request is received from a seller; and the payment coin is issued by a bank with account of the buyer.

Various embodiments are described, wherein creating the payment coin includes digitally signing a commitment based on a payment key of a bank using blind signature scheme.

Various embodiments are described, further including: spending the refund coin to receive a refund having a value corresponding to an unspent portion of the payment coin, wherein the refund coin has a value determined based on unrevealed attributes of the combination of attributes of the partially spent payment coin.

Various embodiments are described, wherein creating the refund coin includes digitally signing a commitment based on a refund key of a bank using a blind digital signature scheme.

Various embodiments are described, further including: confirming an identity of an entity that attempts to spend the refund coin.

Various embodiments are described, wherein: the first asset corresponds to a sum of money deposited into a bank account, and the sum of money backs the total value of the payment coin.

Various embodiments are described, further including: performing a double-refund check prior to issuing the refund.

Various embodiments are described, further including: performing an over-spending check prior to issuing payment to a merchant for the partially spent value of the payment coin.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

Figure 1:
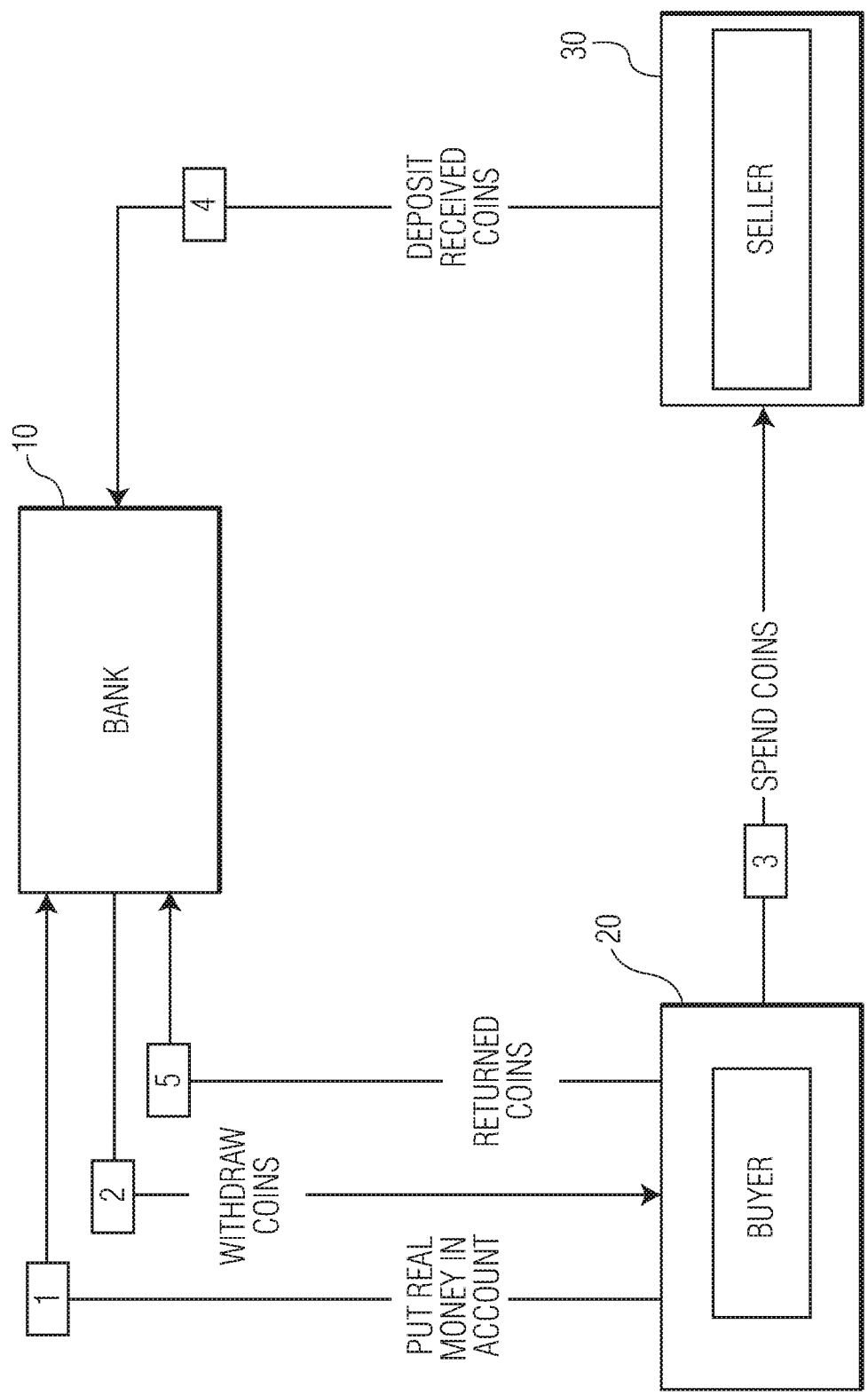
FIG. 1 illustrates a process flow embodiment for managing an e-cash transaction.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Figure 2:
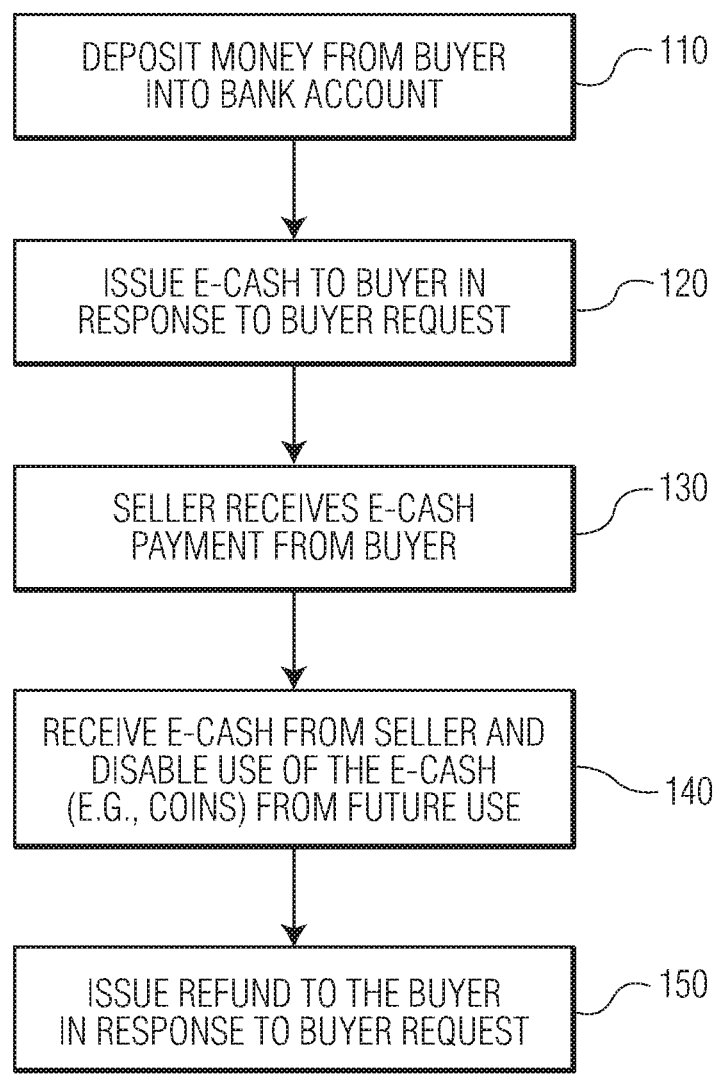
FIG. 2 illustrates an embodiment of a method for managing an e-cash transaction.

FIG. 1 illustrates operations included in an embodiment of a method for processing payments using partially spendable e-cash, and FIG. 2 illustrating an example of the operational flow of information that may take place in the method of FIG. 1. The method may be implemented, for example, in three phases among three entities: Withdrawal phase, Spending phase, and Refund phase. In the Spending phase, a buyer pays for goods or services based on an amount which totals less than the value of a coin secured during the Withdrawal phase. The remainder is then refunded to the buyer during the Refund phase without requiring any participation from the seller The entities involved in processing payments using the partially spendable e-cash include a financial institution 10, a buyer 20, and a seller 30. The financial institution 10 may be a bank, credit union, credit card company, investment firm, or another type of institution which provide accounts to users of the partially spendable e-cash. (For illustrative purposes, the financial institution will be referred to as a bank in the embodiments described below.) The buyer 20 may be, for example, an individual or business with access to a terminal (e.g., smart phone, computer, server, or other device) for performing transactions using the e-cash as described herein. The seller 30 may be an on-line merchant or a so-called brick-and-mortar seller of goods and/or services having a terminal capable of accepting payment made, in whole or part, by the e-cash described herein. Like the buyer, the seller terminal may be, for example, a smart phone, computer, server, or other device. In accordance with one or more embodiments described herein and especially for purposes of interpreting the claims, the terms "bank," "buyer," and "seller" may not correspond to a person but rather may refer to the terminal or other types of electronic devices as described herein.

Referring to FIGS. 1 and 2, the method includes, at 110, receiving (along path 1) a sum of money from the buyer 20 at the bank 10. The money may be real currency received, for example, as a cash deposit by the buyer, which has an account at the bank. In another embodiment, the money may be electronically transferred to the bank by the buyer at a remote location. The account may be a special type of account dedicated for purposes of e-cash transactions, e.g., an account where buyers who are members of the bank can exchange real money for e-cash. In another embodiment, the account may be checking account, savings account, or another type of bank account. When the money is received, the bank may deposit the money into the account of the buyer and a corresponding accounting operation may be performed by the bank computer system to record the deposit. In one case, the money may be co-mingled with money previously deposited in the account.

At 120, the bank 10 may issue (along path 2) e-cash from the bank account of the buyer 20 based on a buyer request to withdraw a specific amount. The request may be received and the e-cash may be issued at the same time the money was deposited in operation 110 or at a later time. In one embodiment, the e-cash may be issued in one or more predetermined denominations (or "coins") or denomination specified, for example, in the request. The e-cash may be issued, for example, by electronically transferring the one or more coins into a wallet application stored on or otherwise accessible by the buyer, e.g., a smart phone, computer, server, etc., of the buyer. The wallet application may allow the issued coin(s) to be used for payment with a seller who accepts e-cash payments.

At 130, the buyer 20 pays for good(s) and/or service(s) provided from a seller 30 (along path 3) using the one or more of the coins issued in operation 120. The payment may be paid directly to the seller 30 from the wallet application of the buyer or using another electronic method. The payment can be physically made in a variety of ways. For example, the buyer could scan a link to a seller server, which may be used to carry out the transaction online. Another option includes performing the transaction using near-field communications (NFC) or Bluetooth communications between a buyer phone and a seller terminal. Another option includes performing a multi-message communication using the displays and the frontside cameras of two phones. Also, wearables might be used instead of phones. In one case, a smart card may be used as a buyer device.

When the payment is less than the total purchase price of the goods/services, the buyer 20 is due a refund (or colloquially, is due change) based on the difference between the e-cash coin(s) paid to the seller 30 and the total purchase price. In this sense, the e-cash (coin) paid to the seller may be considered to be a partially spent coin. The refund may be implemented in accordance with the embodiments described herein.

At 140, the bank 10 receives (along path 4) the e-cash which the buyer 20 paid to the seller 30. The bank may receive the e-cash through a network connection and may transfer a cash amount (e.g., in currency) corresponding to the e-cash into an account of the seller 30 at the bank 10, through direct deposit into an account of the seller at another financial institution, by another form of electronic payment (e.g., PayPal), through issuance of a check, or another type of money transfer. When the bank receives the e-cash (e.g., coins), an accounting operation may be performed to prevent the particular coin(s) from being used again. This may be accomplished, for example, by determining the identifier associated with the coin(s) or through another method. A more detailed description of these features is provided below.

At 150, the buyer 10 may request a refund from the bank 10 (along path 5) based on the difference between the e-cash that was paid to the seller (e.g., coin(s)) and the total purchase price. The bank 10 may provide the refund when the e-cash is received from the seller 30. In one embodiment, the refund operation may also take place before the purchase operation and before receiving e-cash from the seller. The bank may not link the two operations, as the bank may have no way of determining that the payment coin (which corresponds to the refund coin) was already used, unless a buyer tries to overspend.

The bank 10 may deposit the refund into the account of the buyer or according to another method, for example, based on instructions or preferences indicated in a buyer profile stored by a computer system of the bank.

Through the system and method of these embodiments, e-cash payments can be made without requiring the issuing bank to trust the seller for the refund. Additionally, the seller is not involved at all in the refund process. These improvements may be achieved while at the same time allowing the buyer to spend a partial coin (of e-cash), features which are not possible with existing forms of electronic payment. These features not only increase the efficiency of the electronic payment process from the perspective of both the bank and the seller, but also increases the spending options, anonymity, and convenience of the buyer.

Figure 3:
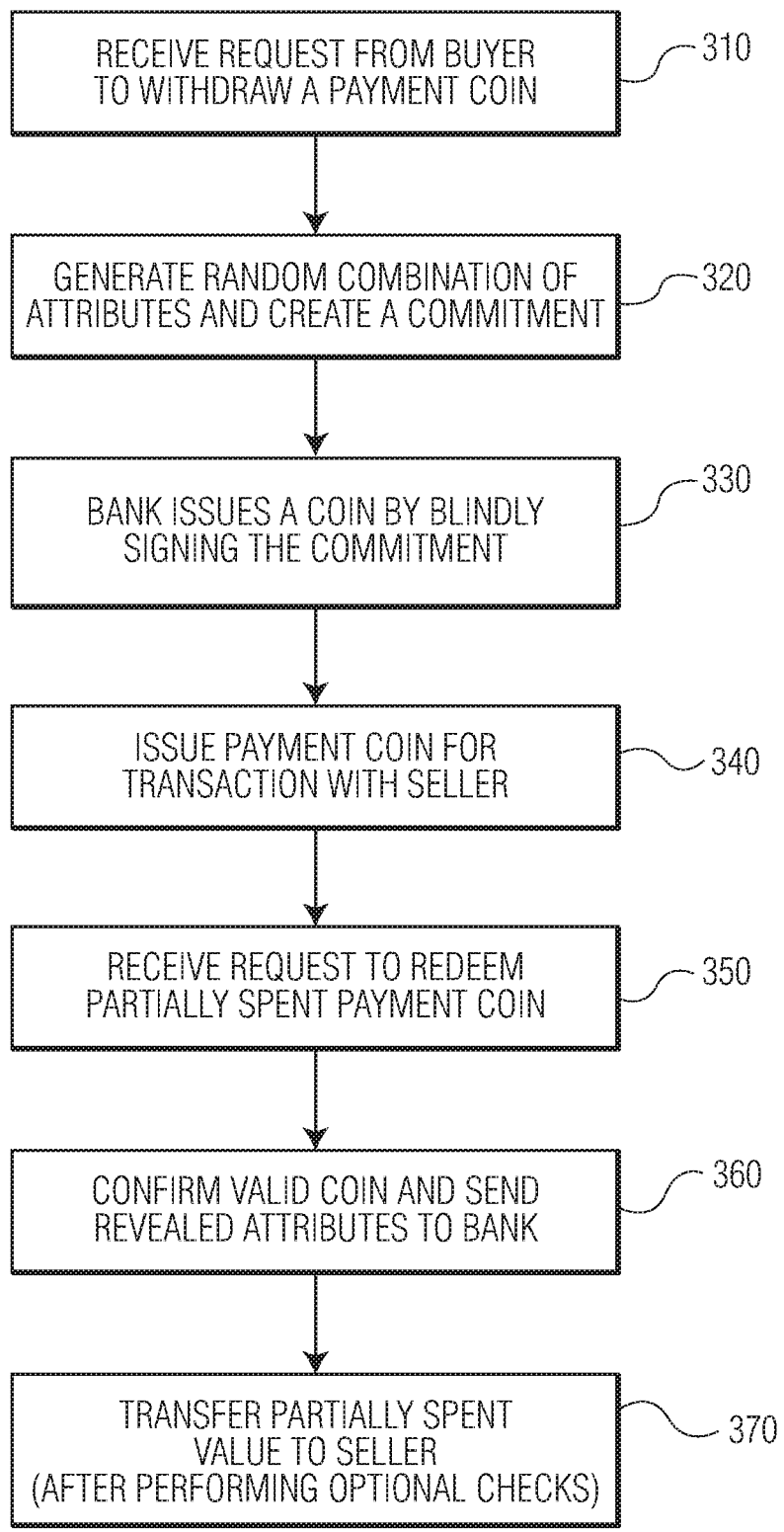
FIG. 3 illustrates another embodiment of a method for managing an e-cash transaction.

FIG. 3 illustrates an embodiment of a method for managing an e-cash transaction based on at least one of the payment coin and refund coin as described herein. In this example, an example of transmissions between the bank and each of the buyer and seller are described. The transmissions may be performed between terminals, smart phones, tablets, computers, and/or other devices of the bank, buyer, and seller using, for example, various encoding and encrypting techniques (e.g., private key, public keys, key pairs, etc.).

Referring to FIG. 3, the method includes, at 310, receiving a first request from a buyer to withdraw a payment coin. The first request may be received by a bank or other financial institution. If the buyer is not already a member of the bank, the buyer may be required to open an account with the bank by presenting identification information and a public key, which may have been obtained by a certificate authority of which the bank is a participant. Once the account has been opened, the buyer may be required to deposit a sum of money into the account in exchange for the requested payment coin.

At 320, after confirming the account of the buyer, the buyer may begin the process of generating a new payment coin. This process may include generating a first combination of attributes for the payment coin. In one embodiment, each attribute of the first combination of attributes may represent a different portion of the total value of the payment coin.

At 330, the buyer commits to the first combination of attributes. Creating the payment coin may include calculating a predetermined commitment function C based on the first combination of attributes, which is then digitally signed by the bank using at least a private key. Examples of the commitment function are discussed below.

At 340, the payment coin is issued to the buyer by the bank based on the amount of money in the account, a line of credit, collateral, or another form of value. The payment coin may then be free to use to purchase goods and services, either at a retail store or on-line. Because of the commitment function C and the first combination of attributes, the payment coin may be partially spent. The buyer may impart partial value to the payment coin by revealing a subset of the first combination of attributes to a seller. The specific attributes that are to be revealed may be determined by a processor of the buyer terminal or device executing one or more algorithms which take the purchase price of the good or services into consideration. The subset of the first attributes may then be presented to the bank by the seller, in order to allow the seller to receive money corresponding to the purchase price, for example, in accordance with the following operations.

At 350, the method includes receiving a second request to redeem the partially spent value of the payment coin. The second request may be received by the bank from the seller after the payment coin has been partially spent. The requests may be received, for example, by the buyer submitting electronic requests to a computer system of the bank, for example, through a bank website or another form of electronic portal.

At 360, the validity of the payment coin may be confirmed, for example, based on a signature of the bank, which itself may be part of the coin. Then, the revealed subset of the first combination of attributes may be validated and transmitted from the seller to the bank in order to allow the seller to redeem the partially spent value of the payment coin.

At 370, once the subset of attributes have been received, the bank may calculate the partially spent portion of the payment coin and then transfer a corresponding amount of money to the seller. In accordance with one embodiment, before the bank transfers any money it may perform three checks. The first check involves verifying the validity of the signature of the payment coin and verifying that the revealed attributes belong to the commitment. The second check involves verifying that the coin has not been used for a payment before, and if used before revealing the cheating buyer or seller. The third check involves verifying that the bank has not previously seen the attributes during a refund process (which may take place before the payment coin is presented to the bank). The money transfer may be performed, for example, by a deposit into an account which the seller maintains with the bank for this purpose or the bank may issue the seller another form of payment for the partially spent payment coin. A refund coin may be used to process a refund to the buyer in a manner described in greater detail below. Use of a refund coin for this purpose may be initiated, for example, by the buyer.

Figure 4:
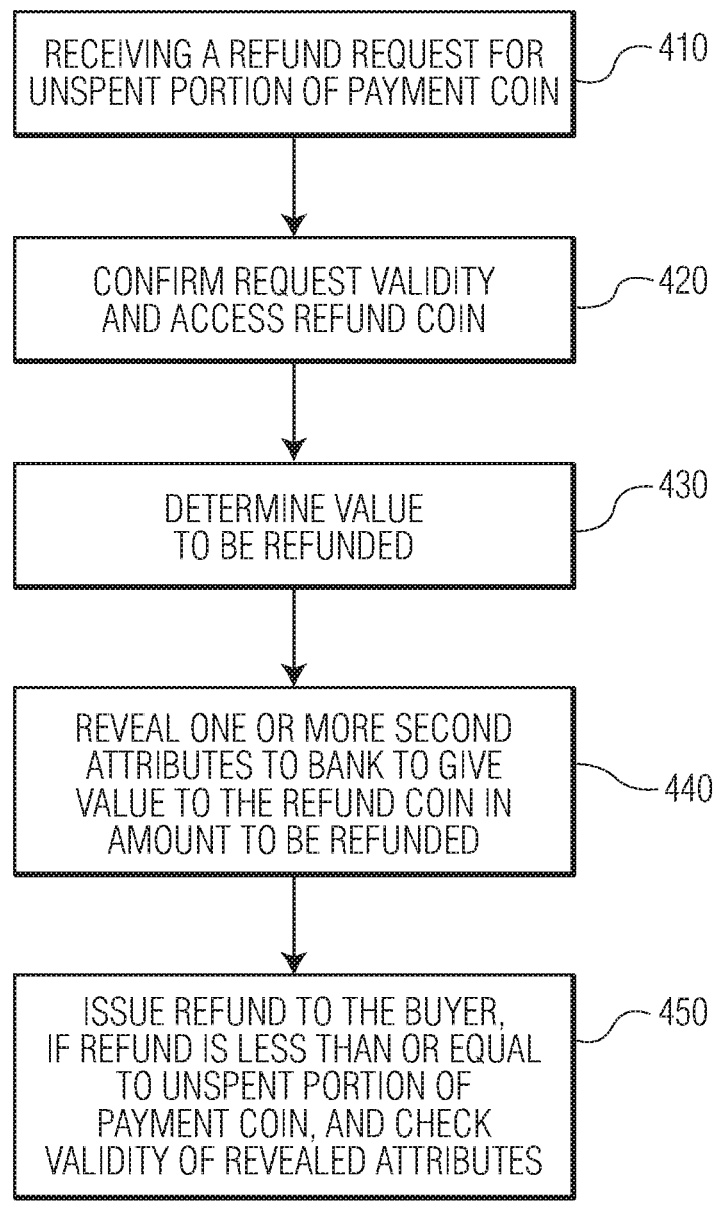
FIG. 4 illustrates another embodiment of a method for managing an e-cash transaction.

FIG. 4 illustrates an embodiment of a method for managing an e-cash transaction in accordance with operations that include providing a refund for an unspent portion of the payment coin after a transaction has been performed. At 410, the method includes receiving a request for a refund for the unspent portion of a partially spent payment coin. The request may be received by electronic transmission to a network of the bank. For example, the request may be sent through a website of the bank hosted on a cloud-based system or through another type of secured connection.

At 420, the bank confirms the validity of the request and then accesses a previously generated refund coin corresponding to the payment coin. In one embodiment, the validity of the request may be determined solely based on the validity of a refund coin (e.g., that has been issued by the bank). The refund coin may have been generated at the same time the payment coin was generated. The refund coin may be generated using an algorithm similar to the one used to generate the payment coin, but is executed based on the same unique combination of attributes as the payment coin and a commitment function executed based on this same combination of attributes. The generators in the algorithm may vary in some cases, but the attribute values themselves must be the same because the attribute values may serve as the only link between the payment coin and the refund coin, in some embodiments.

At 430, the bank may determine the value of the refund coin. In one embodiment, the value to be refunded may be upper bounded by the maximum value of the refund coin. However, the actual amount to refund may be determined by the attributes of the refund coin revealed by the buyer to the bank. Whether the refund amount is too high is only subsequently determined.

At 440, value is given to the refund coin in the amount of the unspent portion of the payment coin. This may be accomplished as follows. Like the payment coin, each attribute of the combination of attributes may correspond to a respective portion of the refund coin. When the refund coin is generated before the refund request, value may not yet be given to the coin. Instead, value may be imparted to the coin by the buyer, for example, by revealing (or selecting) a subset of the attributes corresponding to the unspent value of the payment coin. Revealing (or selecting) this subset of attributes effectively constitutes spending the refund coin.

In one particular embodiment, the refund may be performed according to the following operations. First, the buyer reveals one or more second attributes to the bank in the value of the amount to be refunded. The bank then checks the validity of the refund coin by checking the signature of the coin (which has previously been generated by the bank) and checking the validity of the revealed attributes. Then, the bank checks whether it has previously seen the attributes during a payment (e.g., which, if so, may be indicative of a cheating buyer trying to reveal the same attribute(s) during payment and refund) or during a refund (e.g., a cheating user tries to refund twice). If all checks pass, the buyer may be refunded with the requested amount. At 450, the amount of money corresponding to the unspent portion of the payment coin is transferred to the buyer (e.g., into the buyer account) when the refund coin is spent. During this operation, what may be refunded is the amount requested by showing the attributes of the refund coin to the bank. Whether this amount corresponds to the unspent portion of the payment coin may not be guaranteed in all cases. For example, in some cases the amount of the requested refund may be less than or equal to the unspent portion of the payment coin. Under these circumstances, the operation may be determined to be legal and the bank does not see a link between the refund and the payment coin. In other cases, the amount of the requested refund may be greater than the unspent portion of the payment coin. Under these circumstances, the buyer may be one who is trying to cheat and the bank may establish a link between the coins and pursue the fraud attempt.

A number of additional features may be performed in this method. For example, the commitment of the refund coin may be digitally signed by the bank at the time the refund coin is generated. Also, a zero-knowledge proof protocol may be executed for the commitment of the refund coin and also for the payment coin. Additionally, a blind signature protocol may be performed for the commitments of the refund and payment coins. Such a blind signature protocol may allow private features of the payment and refund coins (that are to be kept secret from the bank, and known only to the buyer) to be disguised before it is digitally signed by the bank.

Figure 5:
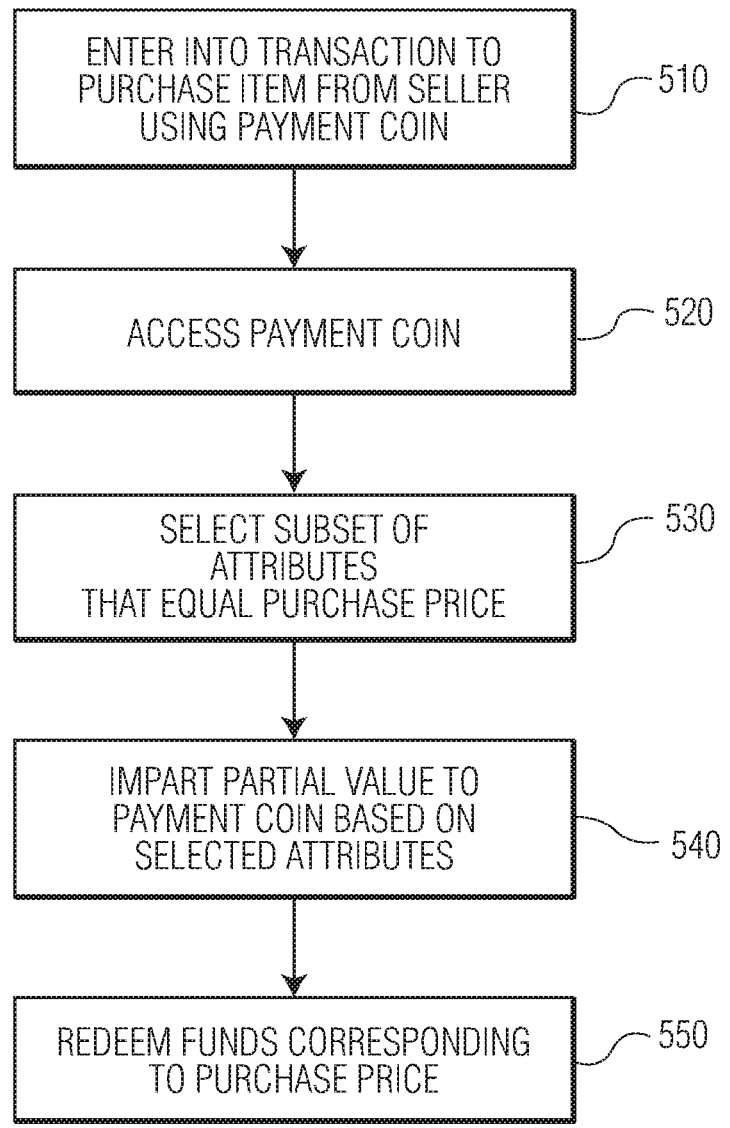
FIG. 5 illustrates another embodiment of a method for managing an e-cash transaction.

FIG. 5 illustrates an embodiment of a method for managing an e-cash transaction using a payment coin generated as described herein. This embodiment provides an example of electronic interactions that may take place between the buyer and seller in connection with a purchase. As in other embodiments, only a portion of the payment coin is spent, leaving the buyer to redeem the unspent portion based on the refund coin.

At 510, a buyer enters into a transaction to purchase an item from a seller using the payment coin. The purchase price is less than a total value of the payment coin. The payment coin may be considered to be partially spent by possessing or revealing a subset of the attributes. The purchase may be made in person at the seller's store or on-line through a website of the seller. The seller may be a private party or a retail store. In one embodiment, the seller may be required to have an account with the bank before the seller is able to accept and redeem money corresponding to the purchase price.

At 520, the buyer may access the payment coin, for example, in a wallet application or directly through a website at a bank. The payment coin may be accessed off-line to increase the convenience of the user. The wallet application may be resident on a portable device or computer of the buyer, and the seller may have a compatible device that is able to interact with the wallet application or bank website for purposes of receiving payment.

At 530, an algorithm on the buyer device selects a subset of the combination of attributes used to generate the commitment for the payment coin. The algorithm selects a subset of attributes such that their associated values total the purchase price of the item bought by the buyer. As previously indicated, a sum of the individual values of the subset of attributes is less than the total value of the payment coin. An example of such an algorithm is discussed below.

For the commitment, generators $h_1$, $h_2$, etc., may be used, where each generator has at least one associated value that is defined by the bank. The buyer may also know the associated value(s) assigned to each generator. Given an amount to pay, the buyer may then reveal those attributes. The attributes may form exponents for the generators, with their associated values summing up to an amount corresponding to the purchase price. For example, consider the case where the values associated with generators $h_1$ to $h_5$ are $2^1$ to $2^5$, respectively. If the purchase price is 9, the attributes which are the exponents of $h_1$ and $h_4$ may be revealed. This may be accomplished based on the following equation:

$$\mathcal{J} = \left\{ i : \left\lfloor \frac{\text{amount mod } 2^i}{2^{i-1}} \right\rfloor = 1 \right\}$$

At 540, the algorithm gives value to the payment coin in an amount which corresponds to the purchase price based on the subset of attributes selected in operation 530. This value may be imparted to the payment coin by revealing the subset of attributes to the seller, for example, through an electronic transmission to the seller terminal. The unselected attributes of the payment coin remain secret in order to protect access to the unspent value of the coin.

At 550, the seller may redeem funds corresponding to the purchase price by communicating the subset of revealed attributes to the bank, together with the coin and the transaction details (containing the proof that attributes are contained in the coin). After the bank confirms the validity of the payment coin and the transaction, and performs a double-spending algorithm, the amount of the purchase price may be transferred to the seller, for example, by a deposit into the seller's account. In one embodiment, the bank may also perform a check to determine that the attributes have not been used during a prior refund.

Figure 6:
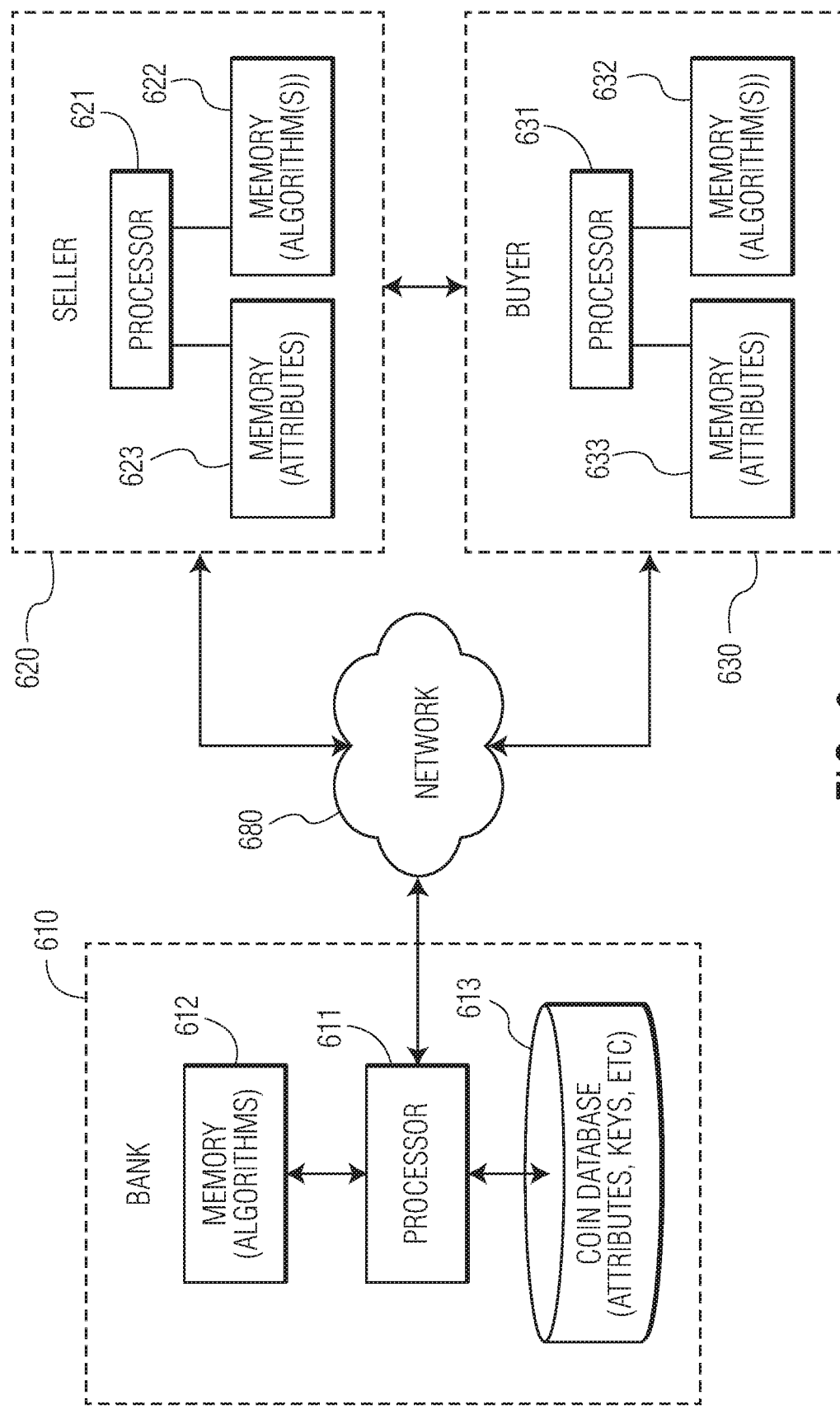
FIG. 6 illustrates an embodiment of a system for managing an e-cash transaction.

FIG. 6 illustrates an embodiment of a system for managing an e-cash transaction as described herein. The system is implemented among three entities: the bank, the buyer, and the seller. These entities include terminals, devices, computer systems, etc., for executing algorithms for performing respective operations relating to the e-cash transaction. These devices may communicate, for example, through a wireless and/or wired network 680 including secured connections.

The bank (or bank terminal) 610 includes a processor 611, a memory 612, and a storage device, which, for example, may be referred to as a coin database 613. The memory 612 stores the algorithm(s) of the system to be performed by the bank in generating payment and refund coins and for interacting with the buyer and seller relating to those coins. For example, the algorithm(s) stored in memory 612 may be executed by the processor 611 for performing the operations of the system and method embodiments described herein. The coin database 613 may store information for the payment and refund coins, including but not limited to the attributes of the coins, keys and other encryption and encoding information, data linking the payment and refund coins, historical information relating to the buyer and seller account, and details of the transaction involving the partial expenditure of the payment coin, as well as other information. Examples of the algorithm(s) are discussed in detail below.

The seller (or seller terminal) 620 includes a processor 621, a first memory 622, and a second memory 623. The first memory 622 may store the algorithm(s) that are to be executed by processor 621 for receiving payment in the form of a partially spent coin from the buyer and for redeeming a monetary value for the partially spent payment coin from the bank. The second memory 623 may store the revealed subset of revealed attributes received from the buyer that give the payment coin its partial value, in connection with the sale of the purchased item to the buyer. Examples of these algorithm(s) are discussed in detail below.

The buyer (or buyer terminal) 630 includes a processor 631, a first memory 632, and a second memory 633. The first memory 632 may store the algorithm(s) to be executed by processor 631 for withdrawing the payment coin from the bank, for giving value to and using the payment coin to purchase an item from the seller, and obtaining a refund from the bank using the refund coin. The second memory 632 may store the combination of first attributes corresponding to the total value of the coin, key information relating to the payment coin and refund coin, and details concerning the transaction with the seller, as well as other information. Examples of these algorithm(s) are discussed in detail below.

Example Implementation

The system and method may generate, process, and otherwise manage anonymous credential-based e-cash that is refundable. The e-cash may be generated in the form of coins, where each coin corresponds to a predetermined amount of currency. Each coin must contain a commitment. The commitment for each coin must be generated by the buyer. For example, the buyer commits to the attributes of the coin, and the bank signs the commitment, thus making the coin legitimate. A coin is only issued by the bank to a buyer when a corresponding amount of currency is deposited into an account of the buyer at the bank, or when some other form of value (e.g., securities, collateral, debt instruments, etc.) accepted by the bank is given by the buyer to back the coin.

In one embodiment, the commitment C for each coin may be based on a unique combination of attributes $L_i$ that are kept secret. The attributes may only be known to the buyer. (If the bank would know all attributes, then it could link a buyer to a transaction.) The bank only learns the attributes when a seller or buyer presents them to the bank during redeeming either a payment or a refund coin. The whole purpose of the commitment is to keep the attributes secret while still uniquely linking them to a coin's signature. The commitment $C=\mathrm{Commit}(L_0, \ldots, L_n; R)$ can be realized by Equation (1). The random value R makes the commitment hiding.

The commitment C for each coin may be determined based on Equation (1), where i is the index of the n attributes for the coin (index i=0 corresponds to the identity attribute, i=1 . . . n correspond to the value attributes), R corresponds to a random number that is used to blind the commitment, r corresponds to the index of the blinding generator $h_r$, and $h_i$ is a generator that is different for each i and different from $h_r$ and represents a certain denomination. Note that the bank who defines the denominations for a specific currency, must not know the discrete logarithms of the generators. This can be achieved by verifiable pseudorandom methods or that these parameters are chosen by an independent trusted third party.

$$C=(\Pi_{i=0\ldots n}h_i^{L_i})h_r^R, \qquad (1)$$

In one embodiment, whenever a new coin is to be issued to a buyer, the bank issues two coins (namely, a payment coin and a refund coin) by performing a blind signature protocol on commitment C using two different private/public key pairs. One coin is created using a refund key of the bank and becomes the refund coin. The other coin is created using a payment key of the bank and becomes the payment coin. One example of an algorithm that may be used to make the payment to a seller is disclosed in *Anonymous Credentials Light*, published in ACM CCS (2013), by F. Baldimtsi and A. Lysyanskaya. This paper described a generic payment scheme but does not disclose any of details described herein relating to the withdrawal and use of the payment coin and the refund coin relative to the allocation of attributes for a partially spent coin, a refund coin, or any of the other uses relating to these types of coins. However, as described in greater detail below, in our scheme, the coin has no value unless the buyer reveals some of the attributes of the coin.

More specifically, the value of the coin is defined by the sum total of all values associated with the attributes created for the coin. However, the coin may have a partial value proportional to the subset of attributes that are revealed by the buyer to the seller, e.g., the value of the payment coin may be defined by the set of revealed attributes, where each attribute $L_i$ has, for example, a value $2^{i-1}$ associated with it. For example, revealing $L_1, L_5, L_6$ could give the coin a value of $2^0+2^4+2^5=49€$. The exact subset of attributes that may total 49€ may be determined, for example, by the algorithm being implemented on the processing device of the buyer. Thus, only a portion of a coin may be paid to a seller by revealing only some of the attributes. In this way, the payment coin may be said to be partially spendable, having a remaining value that corresponds to a refund amount (which may be received by the buyer by effectively spending the refund coin with the bank by revealing the remaining attributes of the coin which were not revealed to the seller).

In one embodiment, double-spending prevention may be performed for the payment coin as well as for the refund coin. The only remaining threat is an entity who tries to pay and refund value, that together exceeds the value of the original coin. For this case, however, at least one attribute must be revealed to the seller as well as to the bank. Cheaters may therefore be identified since the bank stores all the attributes used for refunding together with the identification of the buyer.

One additional privacy risk involves actions taken by the bank. For example, the bank may try to deduce the paid amount via the refund. The bank may use this information to link it to purchases that match this amount. This case may be prevented, for example, by simply using two coins and randomly splitting the amount to pay between the two coins. When implementing the system and method described herein, in one embodiment all operations may be described in terms of modular exponentiations within a multiplicative group G of order q. In another embodiment, all computations may be performed on elliptic curves using scalar multiplications.

Setup

The bank may implement a setup algorithm in preparation for committing, issuing, refunding, and otherwise managing e-cash as described herein. In one embodiment of the setup algorithm, the bank 10 chooses a group G of sufficiently large prime order q, a generator g, and a hash function $\mathcal{H}:\{0,1\}^* \to \mathbb{Z}_q$. For example, q may be a 256-bit prime number in order to provide 128-bit security, g may be a generator of the group G with order q, and hashing into $\mathbb{Z}_q$ may be performed by generating a digest larger than 256 bits using SHA-384 and reducing it mod q. These values may be different in another embodiment.

The bank may also randomly choose z, h, $h_r$, $h_0$, $h_1$, $h_2$, ..., $h_n \in_R G$, where n is the maximum number of attributes. The secret payment key of the bank may be expressed as $x \in_R \mathbb{Z}_q$, the associated public key may be given by $y=g^x$, and z may be the associated tag public key. The secret refund key of the bank may be expressed as $x' \in_R \mathbb{Z}_q$, the associated public key may be given by $y'=g^{x'}$, and z' may be the associated "tag public key." Here, $\mathbb{Z}_q$ may be all natural numbers <q, $x \in_R \mathbb{Z}_q$ means that a number x is chosen uniformly at random from the set $\mathbb{Z}_q$, and the tag public key may be used to achieve blindness of the signature.

Account Opening

Once the processing system of the bank 10 has been setup, the bank may receive a request from a buyer to withdraw one or more coins. Before the buyer can withdraw a coin, the buyer 20 may be required to first open an account with the bank. Prior to opening the account, the buyer 20 may obtain a secret key $L_0 \in_R \mathbb{Z}_q$ and public key $pk_U = h_0^{L_0}$ from a certificate authority. Ideally, a buyer chooses $L_0$ and keeps it secret from anybody. The certificate authority only needs to know the public key. The key exchange can also take place between the bank and the buyer directly if an authenticated channel is available. The certificate authority may be designated by the bank 10 to issue keys for engaging in transactions using the coins described herein. In one embodiment, the certificate authority may be an independent third party relative to the bank.

Once the secret and public keys have been issued, the buyer U may open an account with the bank by presenting the bank with the public key $pk_U = h_0^{L_0}$ and one or more forms of valid identification. In one embodiment, the secret key may be generated by and kept at the buyer. For security and privacy reasons, the buyer 20 must not reveal his secret key $L_0$ to the bank. For each user/buyer, the bank may store public key $pk_U$ and a copy of the identification information in a database of its processing system. The identification information may be a valid driver's license, passport, and/or another acceptable and verifiable type of document confirming the identity of the buyer.

Coin Withdrawal/Issuance

Once an account has been opened for the buyer, the buyer may request the bank to issue one or more coins based on a sum of money deposited into the account of U. This process may be referred to as withdrawing a coin. In order for the buyer 20 to withdraw a coin from the account, the buyer may be required to prove his identity by providing identification information consistent with the form of identification stored in the bank database.

Once the identity of the buyer has been confirmed, a commitment algorithm may be implemented for creating the new coin. For each new coin, this algorithm takes as input n freshly generated random attributes $(L_1, \ldots, L_n)$ and a random value R and then calculating commitment as $C=h_r^R \Pi h_i^{L_i}$ for i=0, ..., n. For example, in order for a buyer to withdraw coins from his account, U first identifies himself to the bank. Then U creates n random attributes $(L_1, \ldots, L_n)$, a value R, commits to those values via $C=h_r^R \Pi h_i^{L_i}$ for i=0, ..., n, sends C to the bank and runs a zero knowledge proof protocol with the bank. That is, the buyer U creates the commitment and the bank must not know the values $(L_0, \ldots, L_n)$ and R. The bank 10 may then run a zero-knowledge proof protocol in order for the buyer to prove to the bank that he knows the secret attributes $(L_1, \ldots, L_n)$ and R. An example of a zero-knowledge proof protocol is the Schnorr identification protocol.

In one embodiment, the zero-knowledge proof (or blind signature) protocol may be performed twice for the same commitment C, once for (x,y,z) in order to yield a payment coin=$(\zeta, \zeta_1, \rho, \omega, \rho_1', \rho_2', \omega')$ which is stored with rnd, τ, and γ by the user and once with (x', y', z') to yield a refund coin'=$(\zeta', \zeta_1', \rho', \omega', \rho_1'', \rho_2'', \omega'')$ which is stored with rnd', τ', and γ' by the user. An example of a general blind signature protocol technique applied in a different context from the embodiments described herein is in *Cryptographic Theory Meets Practice: Efficient and Privacy-Preserving Payments for Public Transport*, by A. Rupp, F. Baldimtsi, G. Hinterwalder, and C. Paar, published in *ACM Transactions on Information and System Security*, 2015. Here, ζ, ζ1, are blinded versions of z, z1 blinded with γ. The other variables of $(\zeta', \zeta_1', \rho', \omega', \rho_1'', \rho_2'', \omega'')$ are the unblinded versions of r, c, $r_1'$, $r_2'$, c'. Also, rnd, γ are blinding values, τ is used to prove that $\zeta = z^\gamma$.

Below an embodiment of a first algorithm that may be implemented for generating the payment coin corresponding to (x,y,z). This algorithm may be applied in an analogous manner to withdraw and perform the blind signature protocol for the refund coin corresponding to (x',y',z'). For these coins, the bank respectively stores $z_1$ and $z_1'$ together with the public key of the buyer 20 corresponding to the coins. The bank needs this for the double-spending check, resp. double-refund checks.

| Bank($y = g^x$, z) | | User($pk_U = h_0^{L_0}$) |
|---|---|---|
| $rnd \in_R \mathbb{Z}_q$, $z_1 = Cg^{rnd}$, $z_2 = z/z_1$ | | |
| u, c', $r_1'$, $r_2' \in_R \mathbb{Z}_q$ | | |
| $a = g^u$, $a_1' = g^{r_1'}z_1^{c'}$, $a_2' = h^{r_2'}z_2^{c'}$ | | |
| | $\xrightarrow{rnd,a,a_1',a_2'}$ | $z_1 = Cg^{rnd}$, $\gamma \in_R \mathbb{Z}_q^*$ |
| | | $\zeta = z^\gamma$, $\zeta_1 = z_1^\gamma$, $\zeta_2 = \zeta/\zeta_1$ |
| | | $\tau \in_R \mathbb{Z}_q$, $\eta = z^\tau$ |
| | | check whether a, $a_1'$, $a_2' \in G$ |
| | | $t_1, t_2, t_3, t_4, t_5 \in_R \mathbb{Z}_q$ |
| | | $\alpha = ag^{t_1}y^{t_2}$, $\alpha_1' = a_1'^\gamma g^{t_3}\zeta_1^{t_4}$ |
| | | $\alpha_2' = a_2'^\gamma h^{t_5}\zeta_2^{t_4}$ |
| | | $\epsilon = \mathcal{H}(\zeta, \zeta_1, \alpha, \alpha_1', \alpha_2', \eta)$ |
| | | $e = (\epsilon - t_2 - t_4)$ mod q |
| c = e - c' mod q | $\xleftarrow{e}$ | |
| r = u - cx mod q | | |
| | $\xrightarrow{c,r,c',r_1',r_2'}$ | $\rho = r + t_1$ mod q |
| | | $\omega = c + t_2$ mod q |
| | | $\rho_1' = \gamma r_1' + t_3$ mod q |
| | | $\rho_2' = \gamma r_2' + t_5$ mod q |
| | | $\omega' = c' + t_4$ mod q |

Referring to the first algorithm, the left column shows information stored by the bank 10 which maintains a public key $y=g^x$ and tag public key z, both of which are to be associated with the payment coin. In the above table, $z_1$, $z_2$ are a random splitting of the tag public key z for the z-side of the proof. $z_1$ is the one-time tag key in the expression rnd $\in_R \mathbb{Z}_q$, $z_1 = Cg^{rnd}$, $z_2 = z/z_1$. In the expression u, c', $r_1'$, $r_2' \in_R \mathbb{Z}_q$, u is an ephemeral key to the y side of the proof, the other values are for the z side. The values in the expressions $a = g^u$, $a_1' = g^{r_1'}z_1^{c'}$, $a_2' = h^{r_2'}z_2^{c'}$ are the commitments to the y-side (a) and the z-side (a1' and a2'). Here, commitment refers to a term used in sigma zero-knowledge protocols, not to mix up with the commitment C from above.

Once these operations are performed, the bank transfers rnd, a, $a_1'$, $a_2'$ to the buyer 20.

Once the buyer receives this information, the buyer performs operations based on the following equations. For $z_1 = Cg^{rnd}$, the buyer may verify that the bank correctly computed z1 by multiplying C times $g^{rnd}$. Then, the buyer selects $\gamma \in_R \mathbb{Z}_q^*$, $\gamma$ is a blinding value for z which is uniformly chosen at random here. In the embodiments described herein, the buyer and seller may refer to computer terminals or other processing logic for performing the operations described herein. The expressions $$\zeta = z^\gamma, \zeta_1 = z_1^\gamma, \zeta_2 = \frac{\zeta}{\zeta_1}$$

are used to blind the tag key and the one-time tag keys. The expression $\tau \in_R \mathbb{Z}_q$, $\eta = z^\tau$ corresponds to the ephemeral key and commitment used to prove $\zeta = z^\gamma$ later on. The operation of checking whether a, $a_1'$, $a_2' \in G$ is performed to make sure those elements are indeed valid group elements. The values $t_1, t_2, t_3, t_4, t_5 \in_R \mathbb{Z}_q$ are blinding values that are chosen. The expressions $\alpha = ag^{t_1}y^{t_2}$, $\alpha_1' = a_1'^\gamma g^{t_3}\zeta_1^{t_4}$ and $\alpha_2' = a_2'^\gamma h^{t_5}\zeta_2^{t_4}$ correspond to blinded versions of a, $a_1$, $a_2$ in order to prevent the bank from linking those values to the buyer. The expression $\epsilon = \mathcal{H}(\zeta, \zeta_1, \alpha, \alpha_1', \alpha_2', \eta)$ corresponds to a hash value over the elements to be signed, and the expression $e = (\epsilon - t_2 - t_4)$ mod q corresponds to a blinded hash value used to prevent the bank from linking those values to the buyer.

Next, the buyer sends e back to the bank. Once the bank receives e from the buyer, the bank computes c=e-c' mod q which corresponds to the difference between the z-side and the y-side values for the OR-proof, and r=u-cx mod q which represents the signing of the differences.

Once these values are computed, the bank transmits c, r, c', $r_1'$, $r_2'$ to the buyer, where c and r are the hash difference and the signature for the verification, respectively, and c', $r_1'$, $r_2'$ are the simulated values for the z-side of the proof, also used in signature verification later on. Once the buyer receives this information, the buyer performs operations to compute the following equations:

$$\rho = r + t_1 \text{ mod } q$$

$$\omega = c + t_2 \text{ mod } q$$

$$\rho_1' = \gamma r_1' + t_3 \text{ mod } q$$

$$\rho_2' = \gamma r_2' + t_5 \text{ mod } q$$

$$\omega' = c' + t_4 \text{ mod } q$$

The above equations constitute unblinding operations performed to allow a buyer to use values in a transaction that the bank has not previously seen, in order to avoid linkability. Once these operations have been performed, the buyer has a payment coin ($\zeta$, $\zeta_1$, $\rho$, $\omega$, $\rho_1'$, $\rho_2'$, $\omega'$) that may be stored together with rnd, $\tau$ and $\gamma$, and a refund coin ($\zeta'$, $\zeta_1'$, $\rho'$, $\omega'$, $\rho_1''$, $\rho_2''$, $\omega''$) that may be stored together with rnd', $\tau'$ and $\gamma'$. Above, only the protocol for (x,y,z) is shown. The protocol for (x', y', z') may be performed in an analogous manner. In one embodiment, both protocols may use the same commitment C (including the same attributes).

Spending

When the buyer wants to purchase a good or service from the seller, the buyer activates a portion of the value of the payment coin that corresponds to the purchase price. This occurs when the purchase price of the good or service is less than a total value of the payment coin.

In order to activate a portion of the total value of the payment coin, an algorithm is implemented on the buyer device that determines a subset of the attributes of the coin that equal (or is most closely correlated) to the purchase price. The algorithm is able to make this determination because the values associated with all of the attributes ($L_1, \ldots, L_n$) are known beforehand (e.g., at the time the currency was created.). Thus, once the purchase price is known, the algorithm may determine an appropriate subset of the attributes to cover the purchase price. The subset of attributes determined by the algorithm may be electronically transferred to the seller in exchange for the good or service purchased. The seller may then redeem currency for the purchase based on subsequent operations.

Below an embodiment of a second algorithm for managing the partial spending of a coin presented as payment to a seller for goods and/or services. In this second algorithm, the column labeled $U(pk_U = h_0^{L_0})$ corresponds to operations performed by the buyer, where U is the buyer with public key $pk_U = h_0^{L_0}$. The adjacent column corresponds to operations involving the seller 30.

| U ($pk_U = h_0^{L_0}$) | M |
|---|---|
| | desc = $\mathcal{H}$ ($I_M$, amount, date/time) |
| $\epsilon_p = \mathcal{H}$ ($z^\tau$, coin, desc) | |
| $\mu_p = \tau - \epsilon_p \gamma$ mod q | |
| $\xleftarrow{desc}$ | |
| $\xrightarrow{\mu_p, \epsilon_p, coin}$ | Check the following equations |
| | $\zeta \neq 1$ |
| | $\epsilon_p = \mathcal{H}$ ($z^{\mu_p} \zeta^{\epsilon_p}$, coin, desc) mod q |
| | $\omega + \omega' =$ |
| | $\mathcal{H}$ ($\zeta, \zeta_1, g^{\rho} y^{\omega}, g^{\rho_1'} \zeta_1^{\omega'}, g^{\rho_2'} \zeta_2^{\omega'}, z^{\mu_p} \zeta^{\epsilon_p}$) mod q |
| $\mathcal{J} = \left\{ i : \left\lfloor \frac{\text{amount mod } 2^i}{2^{i-1}} \right\rfloor = 1 \right\}$ | |
| $r_i \in_R \mathbb{Z}_q$ for i = 0 ... n | |
| $r, r_r \in_R \mathbb{Z}_q$ | |
| $\tilde{\zeta}_1 = g^r h_r^{r_r} \prod_{i=0...n} h_i^{r_i}$ | |
| $\widetilde{C'} = \{\widetilde{C_i'}\}_{i \in \mathcal{J}} = \{z^{r_i}\}_{i=\mathcal{J}}$ | |
| c = $\mathcal{H}$ ($\zeta_1, \tilde{\zeta}_1,, \widetilde{C'}, \zeta, \{L_i\}_{i \in \mathcal{J}}$, desc) | |
| $s_r = r_r + c R \gamma$ | |
| $s_i = r_i + c L_i \gamma$ | |
| $s = r + c$ rnd $\gamma$ | |
| $\xrightarrow{L_i \text{ for } i \in \mathcal{J}, s, s_r, s_i \text{ for } i=0...n, \tilde{\zeta}_1, \widetilde{C'}}$ | c = $\mathcal{H}$ ($\zeta_1, \tilde{\zeta}_1,, \widetilde{C'}, \zeta, \{L_i\}_{i \in \mathcal{J}}$, desc) |
| | Check the following equations |
| | $\tilde{\zeta}_1 \zeta_1^c = g^s h_r^{s_r} \prod_{i=0...n} h_i^{s_i}$ |
| | $\widetilde{C_i'} \zeta^{cL_i} = z^{s_i}$ for each $i \in \mathcal{J}$ |

To perform the payment between the buyer and seller, the buyer releases the coin to the seller 30 together with $\epsilon_p$ and $\mu_p$. Next to releasing the coin, the buyer gives value to the coin by revealing a subset of attributes during spending, as previously described. An embodiment of a method that may be used to perform the payment may begin with the seller transmitting description information desc to the buyer describing the transaction. This may be represented as desc= $\mathcal{H}$ ($I_M$, amount, date/time), where $\mathcal{H}$ corresponds to a hash function as above during the withdrawing phase (technical this very instance of H could hash into a larger domain, but for reasons of simplicity we assume the same hash function), $I_M$ corresponds to the seller identity, amount indicates the purchase price, and, date/time indicates the date and time the purchase was made. In one embodiment, some of this information may be omitted or replaced with other information describing or relating to the transaction.

Once the buyer receives the description desc from the seller, the buyer may determine $\epsilon_p = \mathcal{H}$ ($z^\tau$, coin, desc) and $\mu_p = \tau - \epsilon_p \gamma$ mod q. Here, $\epsilon_p$ and $\mu_p$ are features for the zero-knowledge proof that the buyer knows $\gamma$, where $\epsilon_p$ is the challenge linked to the coin and the payment description and $\mu_p$ is the corresponding proof. The variables in the equations for $\epsilon_p$ and $\mu_p$ may correspond to $z^\tau$, coin, desc as previously described and $\tau - \epsilon_p \gamma$ mod q, where $\tau$ is as previously described.

Once these values are determined, the buyer transmits the values of $\mu_p$ and $\epsilon_p$ to the seller, along with coin. Here, coin refers to the tuple of variables ($\zeta, \zeta_1, \rho, \omega, \rho_1', \rho_2', \omega'$) output by the blind signature algorithm. When this information is received, the seller checks the following equation:

$$\zeta \neq 1$$

To avoid attacks, $\epsilon_p$ may be calculated as follows while implicitly verifying knowledge of $\gamma$.

$$\epsilon_p = \mathcal{H} (z^{\mu_p} \zeta^{\epsilon_p}, \text{coin}, \text{desc}) \bmod q,$$

Also, the following equation may be calculated to perform verification of the coin.

$$\omega + \omega' = \mathcal{H} (\zeta, \zeta_1, g^{\rho} y^{\omega}, g^{\rho_1'} \zeta_1^{\omega'}, ', g^{\rho_2'} \zeta_2^{\omega'}, z^{\mu_p} \zeta^{\epsilon_p}) \bmod q$$

Verification that the coin is a valid one (e.g., has been signed by the bank) may be performed based on $\zeta, \zeta_1$, as previously defined, and more specifically based on the previous four calculations. Additional calculations are performed for the zero-knowledge proofs that allow for coin validation.

When the above equations are confirmed, the seller transmits notification back to the buyer. The buyer then determines the set of attributes to be revealed to the seller based on the equation:

$$\mathcal{J} = \left\{ i : \left\lfloor \frac{\text{amount mod } 2^i}{2^{i-1}} \right\rfloor = 1 \right\}$$

Then, ephemeral keys are chosen for all needed zero-knowledge proofs related to the attributes $L_i$ using the following equation:

$r_i \in_R \mathbb{Z}_q$ for $i=0 \ldots n$

This is followed by an operation which involves choosing ephemeral keys for all needed zero-knowledge proofs related to rnd, R using the following equation:

$r, r_r \in_R \mathbb{Z}_q$

Then, the commitment for the first zero-knowledge proof associated with all the above ephemeral keys is determined based on the following equation:

$$\tilde{\zeta}_1 = g^r h_r^{r_r} \prod_{i=0\ldots n} h_i^{r_i}$$

The commitment for the second zero-knowledge proof associated with the above ephemeral keys, that are associated with the revealed attributes, may then be determined based on the equation:

$$\widetilde{\mathcal{C}'} = \{\widetilde{C_i'}\}_{i \in \mathcal{J}} = \{z^{r_i}\}_{i=\mathcal{J}}$$

A hash over all values used in the zero-knowledge proof is then performed using the following equation:

$c = \mathcal{H}(\zeta_1, \tilde{\zeta}_1, \widetilde{\mathcal{C}'}, \zeta, \{L_i\}_{i \in \mathcal{J}}, \text{desc})$ wherein the proof of knowledge of R is calculated by:

$s_r = r_r + cR\gamma$, and the proof of knowledge of all attributes $L_i$ is calculated by:

$s_i = r_i + cL_i\gamma$, and the proof of knowledge of rnd is calculated by:

$s = r + c \, rnd\gamma$.

The buyer then transmits to the seller the subset of attributes $L_i$ for $i \in \mathcal{J}$, s, $s_r$, $s_i$ for $i=0 \ldots n$, $\tilde{\zeta}_1$, $\widetilde{\mathcal{C}'}$ corresponding to the payment. After the seller receives this information, the seller computes a hash over all values used in the zero-knowledge proof using the following equation:

$c = \mathcal{H}(\zeta_1, \tilde{\zeta}_1, \widetilde{\mathcal{C}'}, \zeta, \{L_i\}_{i \in \mathcal{J}}, \text{desc})$ Then, the seller checks the following equations, where the first equation corresponds to a Proof of knowledge for all $L_i$ and R and the second equation corresponds to a proof of knowledge for the revealed attributes $\{L_i\}_{i \in \mathcal{J}}$.

$$\tilde{\zeta}_1 \zeta_1^c = g^s h_r^{s_r} \prod_{i=0\ldots n} h_i^{s_i}$$

$$\widetilde{C_i'} \zeta^{cL_i} = z^{s_i} \text{ for each } i \in \mathcal{J}$$

Deposit

In order to redeem the payment made by the buyer, the seller deposits (or redeems) the partially spent coin with the bank. This may be accomplished by sending the entire spending transcript, as well as the inputs for desc, from the seller to the bank. The entire spending transcript may refer to all values that have been exchanged between the parties within the spending protocol including public values as the seller identity $I_M$.

The bank then verifies that the coin is valid, that desc correctly encodes its inputs, and that the subset of revealed attributes are correct. This may be performed, for example, by carrying out the same operations as the seller during the payment transaction. Then, a double-spending check is performed by searching the coin database of the bank for duplicate coin entries and then performing $\gamma = (\mu'_p - \mu_p)/(\epsilon_p - \epsilon'_p)$ and $z_1 = \zeta_1^{1/\gamma}$ in case a duplicate coin entry is found. Here, $\mu_p$, $\epsilon_p$ are the values from a transaction when the coin was used with desc and $\mu'_p$, $\epsilon'_p$ are the values from a transaction when the same coin was used with a different purchase description desc'. From two such pairs, the blinding value $\gamma$ and consecutively $z_1$ can be reconstructed. This, in turn, points to the cheating buyer identity (see below). If the check passes, the coin is added to the coin database.

The value of $z_1$ may be stored by the bank in association with the user identification for each withdrawn payment coin. As previously indicated, the identity of a user is not confirmed during a normal transaction, because the user stays anonymous. The purpose of the above equation is to reveal the identity of a cheating user. Only when a user cheats is $\mu_p'$ and $\epsilon_p'$ available. In one embodiment, $z_1$ may be used for determining a double-spending condition exists or cheater. In addition, the bank may perform a check to confirm that no attribute that has been revealed during the spending process has been used before during a refund. The bank may store the entire transcript received form the seller in the database.

Refund

The refund algorithm may be performed in the same way as the spending algorithm, except that the buyer and the bank are interacting with the bank taking the role of the seller. The bank uses the refund key (x', y', z') for verifying the validity of the refund coin, and the buyer spends the refund coin that was generated at the time of withdraw of the payment coin. The refund coin may be generated at the same time the payment coin is generated or may be generated at some time after the payment coin is generated. In one embodiment, a buyer may first perform a refund and only afterwards pay with the payment coin, as long as there is no attempt to gain more than the total value of the payment coin. In accordance with one embodiment, during a refund, a double-spending check may not be performed because the identity of the buyer is known by the bank at that point, since the bank needs to transfer the money to some account (therefore the buyer is authenticated at that point). A refund may be obtained based on operations similar to those performed for allowing the buyer to perform a payment, as previously described. For example, the same protocol may be executed with the bank performing the role of the seller. Thus, within the protocol, the refund keys (x',y',z') as well as the refund coin coin' may be used. The refund transaction description desc is calculated as $\mathcal{H}(I_B, \text{amount}, \text{date/time})$ where the bank identity IB and amount may be empty. As previously indicated, in one embodiment only the double-spending check may be omitted, as it is not needed (because the buyer authenticates himself to the bank anyway). The bank, however, may search the database of attributes that have been used during refund transactions and check whether the coin has already been refunded by searching the database of attributes that have been used during refund. In one embodiment, a double-refund check may involve checking that the coin has not been refunded before, which may be performed using a database lookup operation.

In addition, the bank may perform an overspending check that involves confirming that no attribute revealed during the refund process has been used before during a spending process. The overspending check may be performed at a time when the buyer is logged in. In one implementation, an overspending check may be performed which involves matching the attributes to refund with the attributes used during payments. Refunding may be performed by an online process.

After a refund has been successfully carried out, the bank may store the refunded coin together with the attributes used during the refund in a database. Similarly, when a seller redeems a coin, the bank may also store the payment coin together with the attributes used during the payment in a database. During a double-refund check, the bank may search the database for the coin and the attributes that are to be refunded. If there is any match (either the coin or a single attribute is found in the database), then the refund may be aborted. During an overspending check, the bank may search the database for the attributes that are to be refunded. If there is any match of a single attribute, the refund may be aborted. In one embodiment, the database may be a decentralized database including but not limited to a blockchain.

Technological Innovations

In accordance with one or more of the aforementioned embodiments, a system and method for processing payments using partially spendable e-cash is implemented so that, unlike other forms of e-cash, the bank, buyer, and seller do not need to trust each other. A buyer may use each coin of refundable e-cash only once, but may spend different portions of the coin as payment for corresponding transactions. The remaining unspent value may then be refunded, for example, at a bank or other financial institution without requiring any contribution from the seller. The system and method may be performed so that an entity which tries to refund already spent portions of the coin will be caught. In terms of efficiency, the embodiments described herein may be superior to fully divisible e-cash schemes previously implemented at the cost of a mandatory refund.

Additionally, in at least one embodiment, the storage requirements for each coin may be significantly less (e.g., than one kilobyte) and the number of exponentiations during spending may be logarithmic in N (where N is the value of the coin). For low-resource user devices, the exponentiations may be precomputed before a payment and the corresponding results stored with the coin on the user side. This way, a device only needs to perform a hash operation for payment. Based on these and other features, the embodiments described herein therefore present the first practical partially spendable e-cash scheme.

In one embodiment, the terms "buyer," "seller," and "bank" as used in association with operations of the system and method embodiments may include various types of terminals or devices running application programs based on instructions for performing the operations described herein. In other embodiments, "buyer" and "seller" may indicate entities that are involved in the buying and selling process relating to a purchase.

The processors, algorithms, encryptions, and other information-generating and information-processing features of the embodiments disclosed herein may be implemented in logic which, for example, may include hardware, software, or both. When implemented at least partially in hardware, the processors, algorithms, encryptions, and other information-generating and information-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, algorithms, encryptions, and other information-generating and information-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method for managing an e-cash transaction, comprising:
   receiving a first request to withdraw a payment coin;
   receiving a commitment to a combination of attributes for the payment coin, wherein the attributes are exponents of associated generators, each generator has an associated value, and the value of the payment coin is based upon a sum of the each of the generators raised to its associated attribute;
   creating the payment coin based on the commitment to the combination of attributes;
   issuing the payment coin in exchange for a first asset, wherein each attribute of the combination of attributes represents a different portion of a total value of the payment coin and a partially spent value of the payment coin is based on a revealed subset of the combination of attributes of the payment coin;
   issuing a refund coin, at the same time as issuing the payment coin, based on the commitment to the combination of attributes; and
   spending the refund coin to issue a refund for an unspent portion of the payment coin, wherein the refund coin has a value determined based on an unrevealed subset of the combination of attributes of the payment coin and the determined value is received by revealing the unrevealed subset of attributes of the payment coin.

2. The method of claim 1, further comprising:
receiving a second request to redeem the partially spent value of the payment coin;
confirming validity of the payment coin;
receiving the revealed subset of the combination of attributes;
confirming the validity of the revealed subset of the combination of attributes; and
providing a second asset for the partially spent value of the payment coin.

3. The method of claim 2, wherein the first request is received from a buyer, the second request is received from a seller, and the payment coin is issued by a bank with an account of the buyer.

4. The method of claim 1, wherein creating the payment coin further comprises:
digitally signing a commitment based on a payment key of a bank using a blind signature scheme.

5. The method of claim 1, wherein creating the refund coin further comprises:
digitally signing the commitment based on a refund key of a bank using a blind signature scheme.

6. The method of claim 1, further comprising:
confirming an identity of an entity that attempts to spend the refund coin.

7. The method of claim 1, further comprising:
performing a double-refund check prior to issuing the refund coin.

8. The method of claim 1, wherein the first asset corresponds to a sum of money deposited into a bank account, and the sum of money backs the total value of the payment coin.

9. The method of claim 1, further comprising:
performing an over-spending check prior to issuing payment to a merchant for the partially spent value of the payment coin.

10. A method for managing an e-cash transaction, comprising:
withdrawing a payment coin in exchange for an asset;
imparting a partial value to the payment coin based on a purchase price;
spending the payment coin to buy an item for the purchase price; and
redeeming an unspent portion of the total value of the payment coin, wherein the payment coin is based on a combination of attributes, each attribute representing a different portion of a total value of the payment coin, and the partial value corresponds to a subset of the combination of attributes, spending the payment coin further includes revealing the subset of the combination of attributes to a seller for submission to a bank for redeeming the partial value, and redeeming the unspent portion includes spending a refund coin, generated at the same time the payment coin is generated, that is based on an unrevealed subset of the combination of attributes of the payment coin by revealing the unrevealed subset,
wherein the attributes are exponents of associated generators, each generator has an associated value, and the value of the payment coin is based upon a sum of the each of the generators raised to its associated attribute.

11. A system for managing an e-cash transaction, comprising:
a storage area configured to store information of a payment coin;
a memory configured to store instructions of at least one algorithm to manage the payment coin; and
a processor configured to execute the at least one algorithm to:
receive a first request to withdraw a payment coin;
generate a combination of attributes for the payment coin;
generate a commitment to the combination of attributes, wherein the attributes are exponents of associated generators, each generator has an associated value, and the value of the payment coin is based upon a sum of the each of the generators raised to its associated attribute; and
issue the payment coin in exchange for a first asset, wherein each attribute of the combination of attributes represents a different portion of a total value of the payment coin and wherein a partially spent value of the payment coin is based on a revealed subset of the combination of attributes of the payment coin;
create a refund coin, at the same time as issue of the payment coin, based on the combination of attributes; and
spend the refund coin to issue a refund for an unspent portion of the payment coin, wherein the refund coin has a value determined based on an unrevealed subset of the combination of attributes of the payment coin and the determined value is received by revealing the unrevealed subset of attributes of the payment coin.

12. The system of claim 11, wherein the processor is configured to execute the at least one algorithm to:
receive a second request to redeem the partially spent value of the payment coin;
confirm validity of the payment coin;
receive the revealed subset of the combination of attributes;
confirm validity of the revealed subset of the combination of attributes; and
provide a second asset for the partially spent value of the payment coin.

13. The system of claim 12, wherein the processor is configured to
generate the payment coin by digitally signing a commitment based on a payment key of a bank, using a blind digital signature scheme.

14. A method for managing an anonymous e-cash transaction, comprising:
receiving a first request to withdraw a payment coin;
generating a random combination of attributes for the payment coin;
computing a commitment for the combination of attributes of the payment coin, wherein the attributes are exponents of associated generators, each generator has an associated value, and the value of the payment coin is based upon a sum of the each of the generators raised to its associated attribute; and
issuing the payment coin in exchange for a first asset, wherein each attribute of the combination of attributes contained in the payment coin represents a different portion of a total value of the payment coin, and wherein a partially spent value of the payment coin is based on a revealed subset of the combination of attributes of the payment coin; and
issuing a refund coin based on the first request and at the same time as issuing the payment coin, wherein a value of the refund coin is based on an unrevealed subset of the combination of attributes of the payment coin and the value is received by revealing the unrevealed subset.

15. The method of claim 14, further comprising:
spending the refund coin to issue a refund having a value corresponding to an unspent portion of the payment coin.

16. The method of claim 15, further comprising:
performing a double-refund check prior to issuing the refund coin.

17. The method of claim 14, further comprising:
performing an over-spending check prior to issuing payment to a merchant for the partially spent value of the payment coin.

18. A method for managing an anonymous e-cash transaction, comprising:
receiving a first request to withdraw a payment coin;
generating a random combination of attributes to generate the payment coin, wherein the attributes are exponents of associated generators, each generator has an associated value, and the value of the payment coin is based upon a sum of the each of the generators raised to its associated attribute;
computing commitments for the combination of attributes of the payment coin and a refund coin, respectively;
creating the refund coin, at the same time the payment coin is created, with a commitment to the combination of attributes for the payment coin;
issuing the payment coin and the refund coin, the payment coin issued in exchange for a first asset, wherein each attribute of the combination of attributes contained in the payment coin represents a different portion of a total value of the payment coin, and a partially spent value of the payment coin is based on a revealed subset of the combination of attributes of the payment coin; and
spending the refund coin to receive a refund having a value corresponding to an unspent portion of the payment coin, wherein the refund coin has a value determined based on an unrevealed subset of the combination of attributes of the payment coin and the determined value is received by revealing the unrevealed subset of attributes of the payment coin.

19. The method of claim 18, wherein the first request is received from a buyer, the second request is received from a seller, and the payment coin is issued by a bank with an account of the buyer.

20. The method of claim 18, wherein creating the payment coin further comprises:
digitally signing a commitment based on a payment key of a bank using blind signature scheme.

21. The method of claim 18, wherein creating the refund coin further comprises:
digitally signing a commitment based on a refund key of a bank using a blind digital signature scheme.

22. The method of claim 18, further comprising:
confirming an identity of an entity that attempts to spend the refund coin.

23. The method of claim 18, wherein the first asset corresponds to a sum of money deposited into a bank account, and the sum of money backs the total value of the payment coin.

24. The method of claim 18, further comprising:
performing a double-refund check prior to issuing the refund coin.

25. The method of claim 18, further comprising:
performing an over-spending check prior to issuing payment to a merchant for the partially spent value of the payment coin.

* * * * *